United States Patent
Bala et al.

(10) Patent No.: US 9,710,727 B2
(45) Date of Patent: Jul. 18, 2017

(54) ANOMALY DETECTION USING A KERNEL-BASED SPARSE RECONSTRUCTION MODEL

(71) Applicants: Raja Bala, Pittsford, NY (US); Vishal Monga, State College, PA (US); Xuan Mo, State College, PA (US); Zhigang Fan, Webster, NY (US)

(72) Inventors: Raja Bala, Pittsford, NY (US); Vishal Monga, State College, PA (US); Xuan Mo, State College, PA (US); Zhigang Fan, Webster, NY (US)

(73) Assignee: Conduent Business Services, LLC, Dallas, TX (US)

( * ) Notice: Subject to any disclaimer, the term of this patent is extended or adjusted under 35 U.S.C. 154(b) by 673 days.

(21) Appl. No.: 13/773,097

(22) Filed: Feb. 21, 2013

(65) Prior Publication Data

US 2014/0232862 A1 Aug. 21, 2014

Related U.S. Application Data

(60) Provisional application No. 61/731,133, filed on Nov. 29, 2012.

(51) Int. Cl.
*G06K 9/62* (2006.01)
*G06K 9/00* (2006.01)
(52) U.S. Cl.
CPC ....... *G06K 9/6256* (2013.01); *G06K 9/00771* (2013.01); *G06K 9/6249* (2013.01)

(58) Field of Classification Search
None
See application file for complete search history.

(56) References Cited

U.S. PATENT DOCUMENTS

| 2005/0238238 | A1* | 10/2005 | Xu | G06K 9/00711 382/224 |
|---|---|---|---|---|
| 2010/0278420 | A1 | 11/2010 | Shet et al. | |

OTHER PUBLICATIONS

Burges ("A Tutorial on support vector machines for pattern recognition" Data Mining and Knowledge Discovery 2, 1998).*
Boser, B. E. et al., "A Training Algorithm for Optimal Margin Classifiers," in Proceedings of the fifth annual workshop on Computational learning theory, New York, NY, COLT '92, pp. 144-152, ACM.

(Continued)

*Primary Examiner* — Kate Luo
(74) *Attorney, Agent, or Firm* — Kevin Soules; Kermit D. Lopez; Luis M. Ortiz

(57) ABSTRACT

A method and system for detecting anomalies in video footage. A training dictionary can be configured to include a number of event classes, wherein events among the event classes can be defined with respect to n-dimensional feature vectors. One or more nonlinear kernel function can be defined, which transform the n-dimensional feature vectors into a higher dimensional feature space. One or more test events can then be received within an input video sequence of the video footage. Thereafter, a determination can be made if the test event(s) is anomalous by applying a sparse reconstruction with respect to the training dictionary in the higher dimensional feature space induced by the nonlinear kernel function.

14 Claims, 7 Drawing Sheets

(56) References Cited

OTHER PUBLICATIONS

CAVIAR: Context Aware Vision Using Imaged-based Active Recognition, http://homepages.inf.ed.ac.uk/rbf/CAVIAR, printed Nov. 15, 2012, 3 pages.

Fu, Z. et al., "Similarity Based Vehicle Trajectory Clustering and Anomaly Detection," IEEE International Conference on Image Processing, 2005 (ICIP'05) 2:602-605.

Han, M. et al., "An Algorithm for Multiple Object Trajectory Tracking," in Computer Vision and Pattern Recognition, CVPR 2004. Proceedings of the 2004 IEEE Computer Society Conference on, vol. 1, Jun.-Jul. 2, pp. I-864-I-871.

Hu, W. et al., "A Survey on Visual Surveillance of Object Motion and Behaviors,"IEEE Transactions on Systems, Man, and Cybernetics—Part C: Applications and Review (2004) 34(3):334-352.

Junejo, I. N. et al., "Multi Feature Path Modeling for Video Surveillance," In Proc. IEEE Int. Conf. Pattern Recognition, vol. 2, pp. 716-719, Aug. 2004.

Li. C. et al., "Abnormal Behavior Detection via Sparse Reconstruction Analysis of Trajectory," 2011 Sixth International Conference on Image and Graphics, Aug. 2011, pp. 807-810.

Piciarelli, C. et al. "Trajectory-Based Anomalous Event Detection," IEEE Transactions on Circuits and Systems for Video Technology (2008) 18(11):1544-1554.

Saligrama, V. et al., "Video Anomaly Identification," IEEE Signal Processing Magazine (2010) Sep., pp. 18-33.

B. Scholkopf and A. J. Smola, Learning with Kernels: Support Vector Machines, Regularization, Optimization, and Beyond, The MIT Press, 2001.

Tropp, J. A. et al., "Algorithms for Simultaneous Sparse Approximation Part I: Greedy Pursuit," Elsevier Signal Process.—Special Issue on Sparse Approximations in Signal and Image Processing, vol. 86, No. 3, pp. 572-588, Mar. 2006.

Tropp, J. A. et al., "Signal Recovery from Random Measurements Via Orthogonal Matching Pursuit," IEEE Transactions on Information Theory (2007) 53(12):4655-4666.

Wright, J. et al., "Robust Face Recognition via Sparse Representation," IEEE Transactions on Pattern Analysis and Machine Intelligence (2009) 31(2):210-227.

Yilmaz, A. et al. "Object Tracking: A Survey," ACM Computing Surveys (2006) 38(4):1-45, Article 13.

* cited by examiner

Algorithm 1 KOMP

Input: Dictionary $A=[a_1\ a_2\ \ldots\ a_K]$, data vector $y$, kernel function $K$, a stopping criterion Initialization: compute the kernel matrices $\theta_A$ and $\theta_{A,y}$, Set index set $\Lambda_0 = \arg\max_i \|(\theta_{A,y})_i; \cdot\|_2$ and iteration counter $t = 1$.

1: while stopping criterion has not been met do

1) Compute the correlation matrix
   $$C = \theta_{A,y} - (\theta_A)_{:,\Lambda_{t-1}}((\theta_A)_{\Lambda_{t-1},\Lambda_{t-1}} + \lambda I)^{-1}(\theta_{A,y})_{\Lambda_{t-1},:}$$

2) Select the new index as $\lambda_t = \arg\max_i \|C_i; \cdot\|_2$

3) Update the index set $\Lambda_t = \Lambda_{t-1} \cup \{\lambda_t\}$

4) $t \leftarrow t+1$

2: end while

Output: Index set $\Lambda = \Lambda_{t-1}$, the sparse representation $\alpha' = (\theta_{A,\Lambda} + \lambda I)^{-1}(\theta_{A,y})_{\Lambda,:}$

*FIG. 9*

ANOMALY DETECTION USING A KERNEL-BASED SPARSE RECONSTRUCTION MODEL

CROSS-REFERENCE TO PROVISIONAL APPLICATION

This patent application claims the benefit under 35 U.S.C. §119(e) of U.S. Provisional Application Ser. No. 61/731,133 entitled "Anomaly Detection Using a Kernel-Based Sparse Reconstruction Model," which was filed on Nov. 29, 2012 and is incorporated herein by reference in its entirety.

FIELD OF THE INVENTION

Embodiments are generally related to image-processing methods and systems Embodiments are further related to video-based surveillance methods and systems. Embodiments are additionally related to video-based anomaly detection.

BACKGROUND

With an increasing demand for security and safety, video-based surveillance systems are being increasingly used in urban locations. Vast amounts of video footage are collected and analyzed for traffic violations, accidents, crime, terrorism, vandalism, and other suspicious activities. Since manual analysis of such large volumes of data is prohibitively costly, there is a desire to develop effective algorithms that can aid in the automatic or semi-automatic interpretation and analysis of video data for surveillance and law enforcement. An active area of research within this domain is video anomaly detection, which refers to the problem of finding patterns in data that do not conform to expected behavior, and that may warrant special attention or action. The focus of this invention is in the detection of anomalies in the transportation domain.

Examples include traffic violations, unsafe driver and pedestrian behavior, accidents, etc. FIGS. 1(a)-1(d) depict some example of transportation related anomalies. For example, in FIG. 1(a), image 102 depicts a lobby with individuals walking with respect to an anomalous area 103. FIG. 1(b) depicts an image 104 of a street scene with an anomalous area 105. FIG. 1(c) depicts an image 106 showing a street scene including a bicyclist and a two automobiles. FIG. 1(d) depicts an image 108 of a street scene including an automobile passing through an intersection.

Video-based anomaly detection (AD) has recently received much recent attention. One class of techniques relies upon object tracking to detect nominal object trajectories and deviations thereof. This approach is appealing for traffic-related anomalies since there are many state-of-the-art tracking techniques that can be leveraged. A common approach is to derive nominal vehicle paths and look for deviations thereof in live traffic video data. During the test or evaluation phase, a vehicle is tracked and its path compared against the nominal classes. A statistically significant deviation from all classes indicates an anomalous path.

Primary challenges in anomaly detection include: i) successful detection of abnormal patterns in realistic scenarios involving multiple object trajectories in the presence of occlusions, clutter, and other background noise; ii) development of algorithms that are computationally simple enough to detect anomalies in quasi-real-time; and iii) the lack of sufficient and standardized data sets, particularly those capturing anomalous events which are rare by definition.

A new breed of techniques based on sparse reconstruction has been successfully applied towards anomaly detection. One potential limitation of the approach is that the effectiveness of the sparsity model largely relies on the structure of training data. If the event classes are not sufficiently linearly separable, the sparse reconstruction may not result in accurate anomaly detection.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, an aspect of the disclosed embodiments to provide for an improved image-processing method and system including the use of kernels to obtained better separability between nominal classes of events in video anomaly detection applications.

The aforementioned aspects and other objectives and advantages can now be achieved as described herein. Methods and systems for detecting anomalies in video footage are disclosed herein. A training dictionary can be configured to include a number of normal event classes, wherein events among the event classes can be defined with respect to n-dimensional feature vectors. A nonlinear kernel function can be defined, which transforms the n-dimensional feature vectors into a higher dimensional feature space. One or more test events can then be received within an input video sequence of the video footage. Thereafter, a determination can be made if the test event(s) is anomalous by deriving a sparse reconstruction with respect to the training dictionary in the higher dimensional feature space induced by the nonlinear kernel function. Anomaly detection is performed by computing a measure of sparsity on the reconstruction and comparing this measure against a threshold.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 9 illustrates an example of one potential algorithm that can be implemented in accordance with an alternative embodiment.

DETAILED DESCRIPTION

Figure 1A:
FIGS. 1(a)-1(d) illustrate example images of transportation related anomalies.
Figure 1B:
Figure 1C:
Figure 1D:

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Recently a new breed of techniques based on sparse reconstruction has been successfully applied towards the classification problem and subsequently for anomaly detection. The basic idea is as follows. In a training step, normal or usual events in the video footage are extracted and categorized into a set of nominal event classes. The categorization is based on a set of n-dimensional feature vectors extracted from the video data and can be performed manually or automatically. In [8], the parametric representations of vehicle trajectories are chosen as the features. The basic premise underlying sparse reconstruction is that any new nominal sample can be well explained by a linear combination of samples within one of the nominal classes.

We now elaborate on the sparse reconstruction model, as it forms the basis for the invention. Arrange the training samples from the i-th class as the columns of a matrix $Ai \in \mathbb{R}^{n \times T}$. The dictionary $A \in \mathbb{R}^{n \times KT}$ of training samples from all K classes is then formed as follows: $A=[A1, A2, \ldots, AK]$. Given sufficient training samples from the m-th trajectory class, a test image $y \in \mathbb{R}^n$ from the same class is conjectured to approximately lie in the linear span of those training samples. Any input trajectory feature vector may hence be represented by a sparse linear combination of the set of all training trajectory samples as follows:

$$y = A\alpha = [A1, A2, \ldots, AK]\alpha 1 \alpha 2 \vdots \alpha K \quad (1)$$

where each $\alpha i \in \mathbb{R}^T$. Typically for a given trajectory y, only one of the $\alpha_i$'s would be active (corresponding to the class/event that y is generated from), thus the coefficient vector $\alpha \in \mathbb{R}^{KT}$ is modeled as being sparse, and is recovered by solving the following optimization problem:

$$\alpha = \operatorname{argmin}\alpha\alpha 1 \text{ subject to } y - A\alpha 2 < \epsilon \quad (2)$$

where the objective is to minimize the number of non-zero elements in $\alpha$. It is well-known from the compressed sensing literature that using the $l_0$ norm leads to a NP-hard problem. Thus $l_1$ norm is used as effective approximation. The residual error between the test trajectory and each class behavior pattern is computed to find the class to which the test trajectory belongs:

$$riy = y - Ai\alpha i 2 \quad i=1,2,\ldots,K \quad (3)$$

If anomalies have been predefined into their own class, then the classification task also accomplishes anomaly detection. Alternatively, if all training classes correspond to nominal events, then anomalies can be identified via outlier detection. To this end, an index of sparsity (or equivalently, an outlier rejection measure) is defined and used to measure the sparsity of the reconstructed $\alpha$ [7]:

$$SCI\alpha = K \cdot \max i \delta i(\alpha) 1/\alpha 1 - 1 K - 1 \in [0,1] \quad (4)$$

where $\delta i(\alpha): \mathbb{R}^T \rightarrow \mathbb{R}^T$ the characteristic function that selects the coefficients $\alpha i$ with respect to the i-th class. It is readily seen that nominal samples are likely to exhibit a high level of sparsity, and conversely, anomalous samples will likely produce a low sparsity index. A threshold on $SCI\alpha$ determines whether or not the sample is anomalous.

Recently, a joint sparsity model has been developed by the same inventors that successfully detects anomalies involving co-occurrence of two or more events (i.e., see U.S. patent application Ser. No. 13/476,239, entitled "Method and System for Automatically Detecting Multi-Object Anomalies Utilizing Joint Sparse Reconstruction Model," which is incorporated herein by reference in its entirety). A primary advantage of such a sparsity based framework for classification and anomaly detection over other techniques is that it has been shown to be particularly robust against various distortions, notably occlusion. It has also been shown to be robust with respect to the particular features chosen, provided the sparse representation is computed correctly.

One potential limitation of this approach is that the effectiveness of the sparsity model largely relies on the structure of training data. If the event classes are not sufficiently linearly separable, the sparse reconstruction may not result in accurate anomaly detection.

The disclosed embodiments, on the other hand, incorporate a kernel function into the sparse reconstruction model to afford better inter-class separability, and thus superior anomaly detection performance. Kernel-based algorithms can be employed to improve performance of classification algorithms such as, for example, support vector machines. The basic idea is to project the non-separable data into a high dimensional nonlinear feature space in which the data becomes more linearly separable. Essentially, a kernel function exploits the higher-order nonlinear structure of the data that is not captured by linear models.

Specifically, define a kernel function $K: \mathbb{R}^n \times \mathbb{R}^n \rightarrow \mathbb{R}$ as the inner product of two functions: $\kappa x, z = \Phi x, \Phi z$. (This is a common form of kernel used in SVM classifiers [12]). Some common kernel functions include:

1) Gaussian radial basis function (RBF): $\kappa x, z = e^{-\gamma \|x-z\|^2}$, for $\gamma > 0$ 2) Homogeneous polynomial kernel: κ, x, z=(x·z)d
3) Inhomogeneous polynomial kernel: κ, x, z=(x·z+1)d After using the kernel function, the training data is projected into another more linearly separable space: αi ↦ Φ(αi), where αi is the i-th column of A. Let Φ(y) denote the representation of the test trajectory in this space.

The test trajectory can now be represented as follows:

$$\Phi y=\Phi\alpha 1 \ldots \Phi\alpha KT/\alpha 1' \ldots \alpha KT'jT=A\Phi\alpha' \quad (5)$$

where α' is also assumed to be sparse.

Similar to Eq. (2), the new sparse coefficient vector α'∈ ℝ KT can be recovered by solving:

$$\alpha'=\text{argmin}\alpha\alpha 1 \text{ subject to } \Phi(y)-A\Phi\alpha 2<\epsilon \quad (6)$$

Let ΘA∈ℝ n×n be the kernel matrix whose (i,j)-th entry is K(ai, aj) and θA,y∈ℝ n be the vector whose i-th entry is K(ai, y), the correlation (dot product) between a pixel Φ(y) and a dictionary atom Φ(ai) is then computed by:

$$ci=\Phi y, \Phi\alpha i=\kappa\alpha i, y=(\theta A,y)i \quad (7)$$

the orthogonal projection coefficient of Φy onto a set of selected dictionary atoms {Φαn}n∈Λ is given as:

$$P\Lambda=((\Theta A)\Lambda,\Lambda)-1(\theta A,y)\Lambda \quad (8)$$

and the residual vector between Φy and its approximation using the selected atoms {Φαn}n∈Λ=(AΦ):,Λ is then expressed as:

$$\Phi r=\Phi x-(A\Phi):,\Lambda((\Theta A)\Lambda,\Lambda)-1(\theta A,y)\Lambda \quad (9)$$

The correlation between Φr and an atom Φai can be computed by:

$$ci=\Phi r,\Phi\alpha i=(\theta A,y)i-(\Theta A)i,\Lambda((\Theta A)\Lambda,\Lambda)-1(\theta A,y)\Lambda \quad (10)$$

Also, the residue of i-th class becomes:

$$riy=(\kappa y,y-2\alpha'\Omega iT(\theta A,y)\Omega i+\alpha'\Omega iT(\Theta A)\Omega i,\Omega i\alpha'\Omega i)12 \quad (11)$$

where Ωi is the index set associated with the i-th training class.

Therefore, by extending an Orthogonal Matching Pursuit (OMP) approach, the row sparsity model with kernel function can be solved using an algorithm such as, for example, algorithm 960 shown in FIG. 9. Note that it is important to select a good form and parameterization of the kernel function. In the field of machine learning, the optimal kernel is often chosen experimentally.

In a preferred embodiment, the Gaussian RBF kernel function can be applied to the data and with the best parameterization. Specifically, κx, z=e-γ‖x-z‖2 is chosen to be the kernel function and we desire the best parameter γ. To this end, multiple training dictionaries AΦ(γ) are generated for different choices of γ. Inspired by the technique of cross-validation, we split the training data AΦ(γ) into two subsets BΦ(γ) and CΦ(γ) such that both BΦ(γ) and CΦ(γ) have representation from the K classes.

Now if the dictionary in the sparsity model is selected to be equal to BΦ(γ) and a (transformed) test trajectory is picked from CΦ(γ), then ideally we expect perfect classification into one of the K classes. Therefore a good kernel is one that will enable close to ideal classification of test samples from CΦ(γ), which means that only a small number of αj'(γ) are activated (non-zero) and for one particular class. Recall the outlier rejection measure:

$$SCI\alpha j'(\gamma)=K\cdot\text{max}i\delta i(\alpha j'(\gamma))1/\alpha j'(\gamma)1-1k-1 \quad (12)$$

where δi(αj'(γ)) is the vector whose only non-zero entries are the same as those in αj'(γ) associated with class i. SCIαj'(γ) takes on values close to 1 if the classification is accurate.

Therefore, the best γ can be chosen by solving the following kernel parameter optimization problem:

$$\gamma=\text{argmax}\gamma jSCI\alpha j'(\gamma) \quad (13)$$

In summary, the feature space of the single-object sparsity model has been modified by an appropriate kernel function. We conjecture that the new feature space will be more linearly separable, and hence it will enable the sparsity model to detect anomalies with higher accuracy. The aforementioned kernel formulation can be extended to the multi-object joint sparsity model in a relatively straightforward manner.

Figure 2:
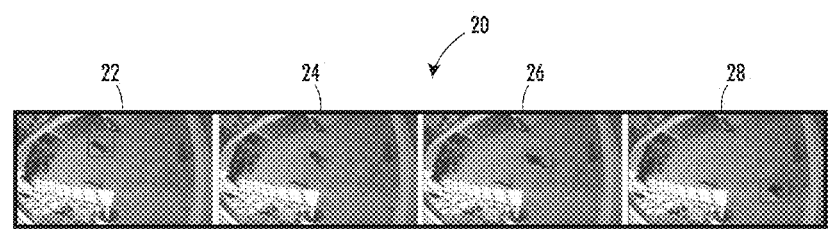
FIG. 2 illustrate images derived from a CAVIAR data set.

Experimental results have been obtained. In one experimental embodiment, for example, a CAVIAR (Context Aware Vision using Image-Based Active Recognition) standard video data set can be employed to evaluate the approach described herein. This data set can include, for example, trajectories of people walking across a public atrium. An example of CAVIAR data can be seen in FIG. 2, where a man suddenly falls on the floor when walking across a lobby. The scenario of FIG. 2 includes a series of images 20 include images 22, 24, 26, and 28.

The training dictionary includes 10 normal trajectory classes and 3 anomalous trajectory classes, and each class contains 10 trajectories. 21 normal trajectories and 19 anomalous trajectories are used as independent test data. Because anomalous events are well-represented in this database, a separate anomalous class can be trained and Equation (3) above can be employed to classify both normal and anomalous test trajectories. The disclosed approach (abbreviated to JKSM) can be compared to one of the state of the art algorithms. Confusion matrices of such state of the art algorithms can be compared to the original sparsity model and kernel-based sparsity model in Table I. Note that "Piciarelli et al" refers to the following reference: C. Piciarelli, C. Micheloni, and G. Foresti, "Trajectory-based anomalous event detection," IEEE Trans. Circuits Syst. Video Technol., vol. 18, no. 11, pp. 1544-1554, 2008. "Li et al" refers to: C. Li et al, "Abnormal Behavior Detection via Sparse Reconstruction Analysis of Trajectory", Proc. IEEE 6th Int. Conf on Image & Graphics, pp. 807-810, 2011. Both Piciarelli et al and Li et al are incorporated herein by reference in their entireties.

We note first that the superior performance of the sparsity model over Piciarelli's approach is significant and attributed to the merits of sparse reconstruction in solving the classification problem. Secondly, and more importantly, we observe that the kernel serves to further increase the identification accuracy.

TABLE I

Confusion matrices on CAVIAR data

| | Piciarelli et al. | | Li et al. | | JKSM | |
|---|---|---|---|---|---|---|
| | Normal | Anomaly | Normal | Anomaly | Normal | Anomaly |
| Normal | 85.7% | 26.3% | 90.5% | 15.8% | 95.2% | 10.5% |
| Anomaly | 14.3% | 73.7% | 9.5% | 84.2% | 4.8% | 89.5% |

Figure 3:
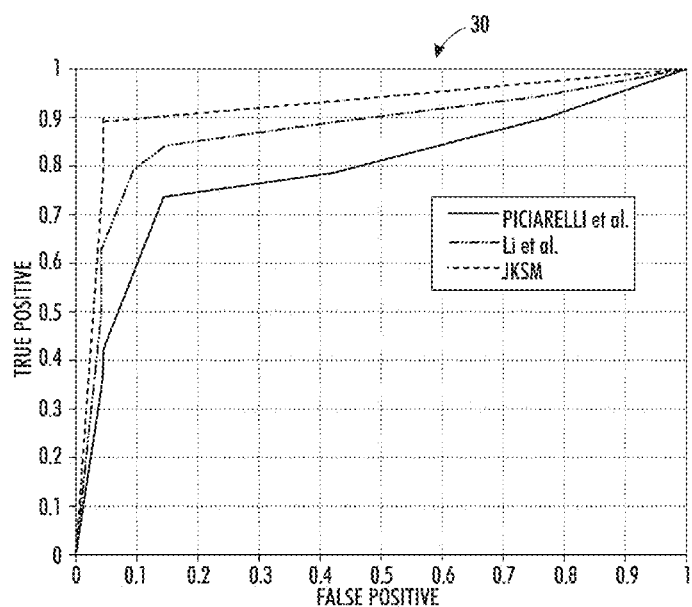
FIG. 3 illustrates a graph depicting data curves derived from three different methods with respect to CAVIAR data.

We generate ROC (Receiver Operating Characteristic) curves for the same data. FIG. 3, for example, reveals that the proposed kernel-based method outperforms the original sparsity model and that of Piciarelli et al. by a considerable margin. FIG. 3 illustrates a graph 30 depicting data curves derived from three different methods with respect to CAVIAR data. These methods are the Piciarelli et al, Li et al, and JKSM approaches, as shown in FIG. 3.

Figure 4:
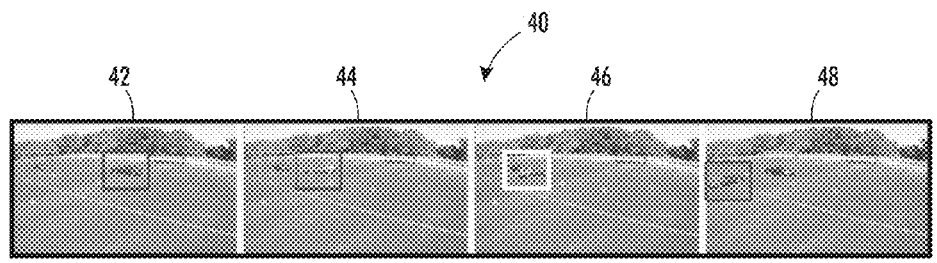
FIG. 4 illustrates images depicting a car failing to yield to an oncoming car while turning left, in accordance with the disclosed embodiments.

The disclosed approach/algorithm can be tested with respect to Intersection data. FIG. 4, for example, depicts an example of Intersection data with respect to a group of images including, for example, images 42, 44, 46, and 48, wherein a car fails to yield to oncoming car while turning left.

Figure 5:
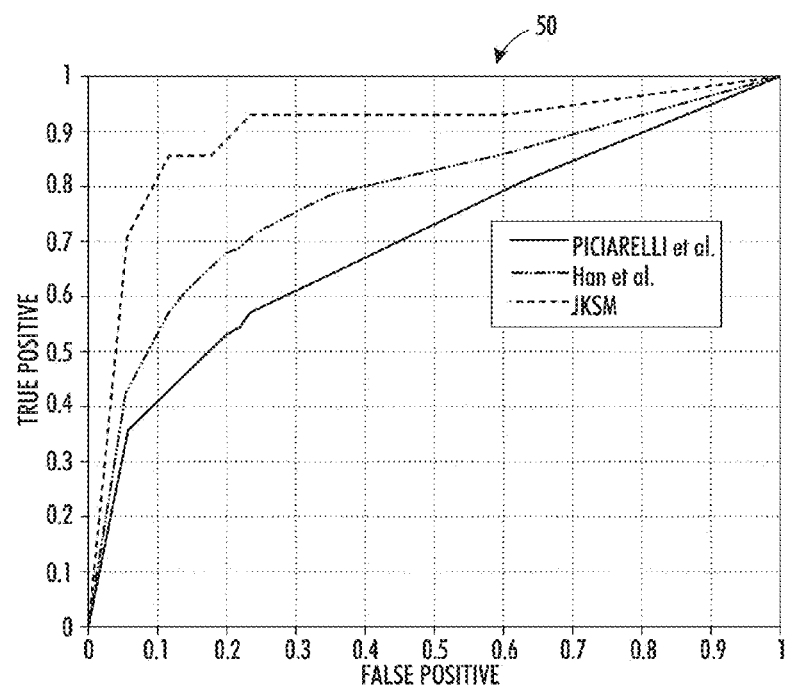
FIG. 5 illustrates a graph depicting receiver operating characteristics (ROC) curves derived from three different methods with respect to intersection data.

In the Intersection data, there are 6 different 2-object normal event classes (containing 6 trajectory pairs each) and 6 different anomalous classes (containing 4 trajectory pairs each). 17 normal trajectory pairs and 14 anomalous trajectory pairs are used for testing. The confusion matrices of our method against the two competing trajectory based techniques are shown in Table II below. The ROC curves are shown in graph 50 of FIG. 5.

TABLE II

Confusion matrices on Intersection data

| | Piciarelli et al._1 | | Piciarelli et al._2 | | Han et al. | | JKSM | |
|---|---|---|---|---|---|---|---|---|
| | Normal | Anomaly | Normal | Normal | Normal | Anomaly | Normal | Anomaly |
| Normal | 58.8% | 7.1% | 94.1% | 64.3% | 82.4% | 35.7% | 88.2% | 14.3% |
| Anomaly | 41.2% | 92.9% | 5.9% | 35.7% | 17.6% | 64.3% | 11.8% | 85.7% |

Because the one class SVMs method in Piciarelli et al. does not capture the interaction between objects, it can only be used for single-object anomaly detection. In order to demonstrate its performance, two (2) extended versions of the Piciarelli et al. can be heuristically defined as follows:
1. Identification both events separately. If either of these two events is anomaly, we assume that this joint event is anomalous. (refer to as Piciarelli et al._1)
2. Identification both events separately. Only if both two events are anomalies, we assume this joint event is anomalous. (refer to as Piciarelli et al._2)

In this case, we separate every 2-object event into 2 individual events as the training for Piciarelli et al._1 and Piciarelli et al._2. The improvement over the technique of Piciarelli et al. is expected since this technique is really for single-object anomaly detection. Note that in Table II and FIG. 5, reference "Han et al." refers to the following reference: M. Han, W. Xu, H. Tao, and Y. Gong, "An algorithm for multiple object trajectory tracking," in Computer Vision and Pattern Recognition, 2004, CVPR 2004, Proceedings of the 2004 IEEE Computer Society Conference on, vol. 1, June-2 July 2004, pp. 1-864-1-871 Vol. 1. Han et al. is incorporated herein by reference in its entirety.

Anomalies can be detected via the use of context based rules on the result of multiple-object tracking. This puts an unreasonable burden on defining these rules and is often restrictive in practice, i.e. not all anomalies can be anticipated. In the proposed joint sparsity model, interactions between distinct object trajectories are better captured and departures from expected "joint behavior" (particularly in the case training for anomalies is absent/limited) is employed which enables the improvement in detection rates.

Figure 6:
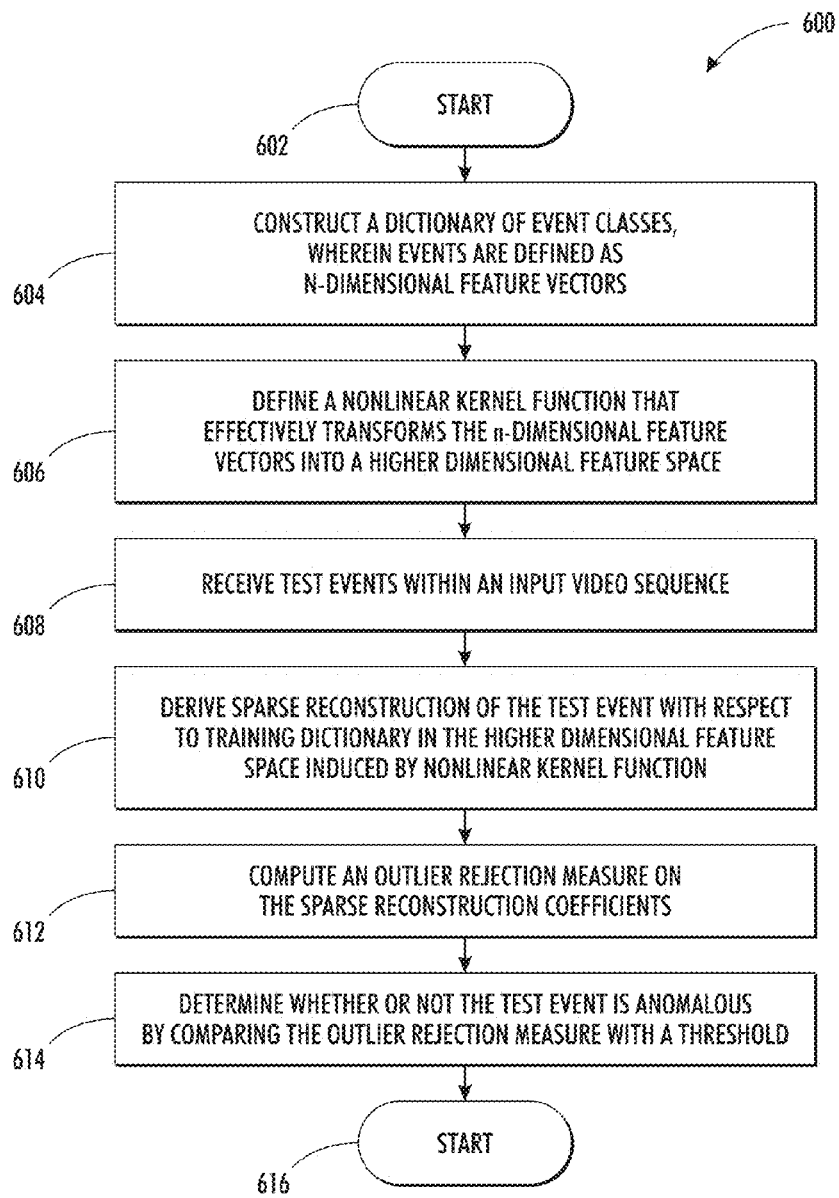
FIG. 6 illustrates a high-level flow chart of operations depicting logical operational steps of an anomaly detection method employing a kernel-based sparse reconstruction model, in accordance with the disclosed embodiments.

FIG. 6 illustrates a high-level flow chart of operations depicting logical operational steps of an anomaly detection method 600 employing a kernel-based sparse reconstruction model, in accordance with the disclosed embodiments. The method 600 can be implemented to detect anomalies in video footage (e.g., transportation-related video footage). The process begins, as indicated at block 602. Thereafter, as shown at block 604, a step or logical operation can be implemented for constructing a dictionary of a plurality of event classes, wherein events are defined as n-dimensional feature vectors.

Next, as shown at block 606, a step or logical operation can be implemented to define a nonlinear kernel function that effectively transforms the n-dimensional feature vectors into a higher dimensional feature space. Then, as shown at block 608, a step or logical operation can be implemented for receiving one or more events within an input video sequence. Thereafter, as described at block 610, a step or logical operation can be implemented to derive a sparse reconstruction of the test event (or test events) with respect to the training dictionary in the higher dimensional feature space induced by nonlinear kernel function. Then, as shown at block 612, a step or logical operation can be provided to compute an outlier rejection measure on the sparse reconstruction coefficients. Thereafter, as illustrated at block 614, a step or logical operation can be implemented to determine whether or not the test event (or test events) is anomalous by comparing the outlier rejection measure with a threshold. The process can then terminate, as shown at block 616.

As will be appreciated by one skilled in the art, the disclosed embodiments can be implemented as a method, data-processing system, or computer program product. Accordingly, the embodiments may take the form of an entire hardware implementation, an entire software embodiment or an embodiment combining software and hardware aspects all generally referred to as a "circuit" or "module." Furthermore, the disclosed approach may take the form of a computer program product on a computer-usable storage medium having computer-usable program code embodied in the medium. Any suitable computer readable medium may be utilized including hard disks, USB flash drives, DVDs, CD-ROMs, optical storage devices, magnetic storage devices, etc.

Computer program code for carrying out operations of the present invention may be written in an object oriented programming language (e.g., JAVA, C++, etc.). The computer program code, however, for carrying out operations of the present invention may also be written in conventional procedural programming languages such as the "C" programming language or in a visually oriented programming environment such as, for example, Visual Basic.

The program code may execute entirely on the user's computer or mobile device, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, WiMax, 802.11x, and cellular network or the connection can be made to an external computer via most third party supported networks (e.g., through the Internet via an internet service provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data-processing apparatus to produce a machine such that the instructions, which execute via the processor of the computer or other programmable data-processing apparatus, create means for implementing the functions/acts specified in the block or blocks discussed herein such as, for example, the various instructions shown with respect to the method 600 illustrated in FIG. 6.

These computer program instructions may also be stored in a computer-readable memory that can direct a computer or other programmable data-processing apparatus to function in a particular manner such that the instructions stored in the computer-readable memory produce an article of manufacture including instruction means which implement the function/act specified in the block or blocks.

The computer program instructions may also be loaded onto a computer or other programmable data-processing apparatus to cause a series of operational steps to be performed on the computer or other programmable apparatus to produce a computer implemented process such that the instructions, which execute on the computer or other programmable apparatus, provide steps for implementing the functions/acts specified in the block or blocks.

Figure 7:
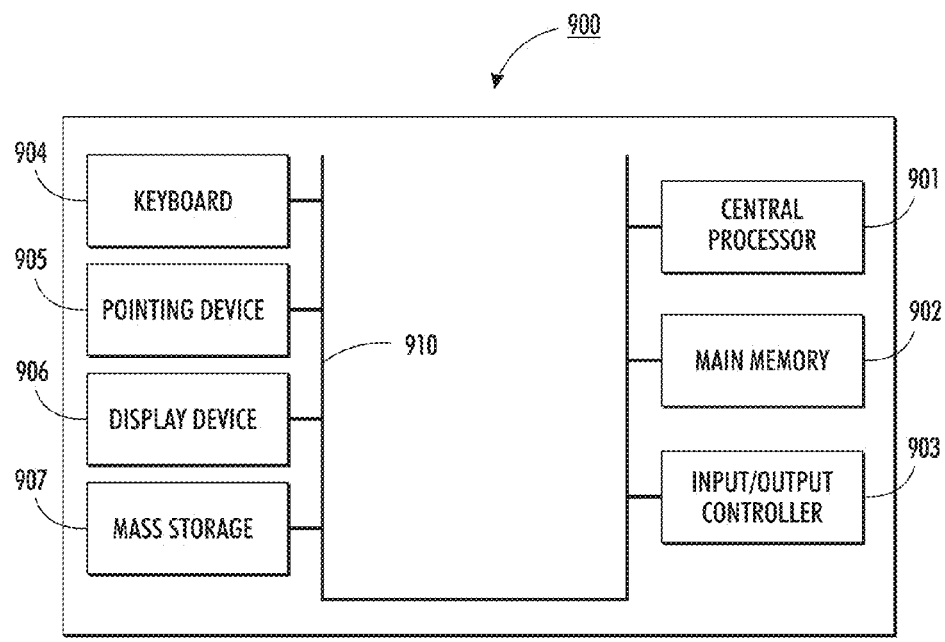
FIG. 7 illustrates a schematic view of a computer system, which can be implemented in accordance with one or more of the disclosed embodiments.
Figure 8:
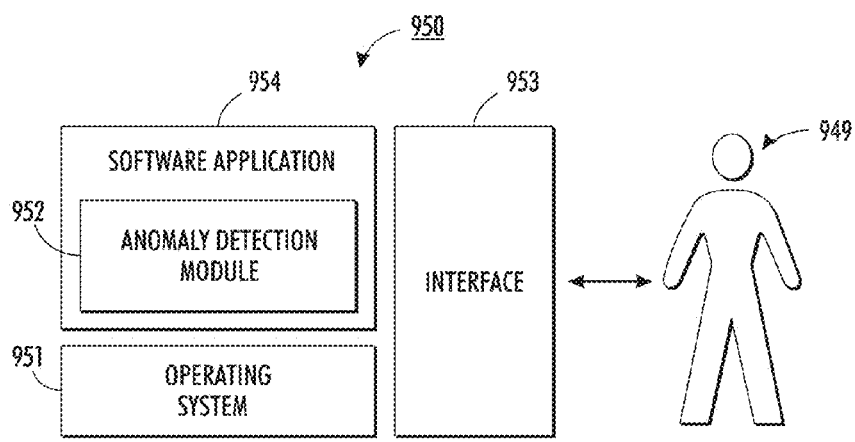
FIG. 8 illustrates a schematic view of a software system including an anomaly detection module, an operating system, and a user interface, in accordance with the disclosed embodiments.

FIGS. 7-8 are provided as exemplary diagrams of data-processing environments in which embodiments of the present invention may be implemented. It should be appreciated that FIG. 7-8 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 7, the disclosed embodiments may be implemented in the context of a data-processing system 900 that includes, for example, a central processor 901 (or other processors), a main memory 902, an input/output controller 903, and in some embodiments, a USB (Universal Serial Bus) or other appropriate peripheral connection. System 900 can also include a keyboard 904, an input device 905 (e.g., a pointing device such as a mouse, track ball, pen device, etc.), a display device 906, and a mass storage 907 (e.g., a hard disk). As illustrated, the various components of data-processing system 900 can communicate electronically through a system bus 910 or similar architecture. The system bus 910 may be, for example, a subsystem that transfers data between, for example, computer components within data-processing system 900 or to and from other data-processing devices, components, computers, etc.

FIG. 8 illustrates a computer software system 950, which may be employed for directing the operation of the data-processing system 900 depicted in FIG. 7. Software application 954, stored in main memory 902 and on mass storage 907, generally can include and/or can be associated with a kernel or operating system 951 and a shell or interface 953. One or more application programs, such as module(s) 952, may be "loaded" (i.e., transferred from mass storage 907 into the main memory 902) for execution by the data-processing system 900. In the example shown in FIG. 8, module 952 can be implemented as, for example, an anomaly detection module that performs the logical instructions or operations of method 600 such as shown in blocks 602, 604, 606, 608, 610, 612, 614, and 616 of FIG. 6, or other appropriate methods/processes discussed and illustrated herein.

The data-processing system 900 can receive user commands and data through user interface 953 accessible by a user 949. These inputs may then be acted upon by the data-processing system 900 in accordance with instructions from operating system 951 and/or software application 954 and any software module(s) 952 thereof.

The discussion herein is thus intended to provide a brief, general description of suitable computing environments in which the system and method may be implemented. Although not required, the disclosed embodiments will be described in the general context of computer-executable instructions such as program modules being executed by a single computer. In most instances, a "module" constitutes a software application.

Generally, program modules (e.g., module 952) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 953 (e.g., a graphical user interface) can serve to display results, whereupon a user may supply additional inputs or terminate a particular session. In some embodiments, operating system 951 and interface 953 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 951 and interface 953. The software application 954 can include, for example, user proximity detection module 952, which can include instructions for carrying out steps or logical operations such as those shown in FIG. 6.

FIGS. 7-8 are thus intended as examples and not as architectural limitations of the disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms including Macintosh, Unix, Linux, and the like.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

The invention claimed is:

1. A method for detecting anomalies in video footage, said method comprising:
    in an offline phase, constructing a training dictionary comprising a plurality of event classes,
    in an offline phase, defining at least one event as an n-dimensional feature vector extracted from training video data;
    in an offline phase, categorizing said events into said plurality of event classes according to said n-dimensional feature vector;
    using parametric representations of vehicle trajectories to define said n-dimensional feature vectors;
    in an offline phase, experimentally selecting at least one optimal nonlinear kernel function;
    in an offline phase, using said selected optimal non-linear kernel function to transform said n-dimensional feature vectors into a higher dimensional feature space by optimizing a kernel function parameterization;
    in an offline phase, setting a threshold indicative of whether or not a sample is anomalous;
    in an online phase, receiving at least one test event comprising a vehicle trajectory within an input video sequence of said video footage;
    in an online phase, deriving a sparse reconstruction with respect to said training dictionary in said higher dimensional feature space induced by said at least one nonlinear kernel function further comprising solving an optimization problem as follows:

$$\hat{\alpha}' = \underset{\alpha}{\operatorname{argmin}} \|\alpha'\|_1$$

subject to $$\|\phi(y) - A_\phi \alpha'\|_2 < \varepsilon$$

wherein $\alpha'$ comprises a sparse reconstruction coefficient vector, $\Phi(y)$ comprises a transformation of a test event vector $y$ into said higher dimensional feature space, and $A_\Phi$ comprises a dictionary representation in said higher dimensional feature space wherein said optimization problem is solved with a modified version of an Orthogonal Matching Pursuit algorithm; and
    in an online phase, determining if said at least one test event is anomalous according to said derived sparse reconstruction according to said threshold with respect to said training dictionary in said higher dimensional feature space induced by said at least one nonlinear kernel function.

2. The method of claim 1 wherein said optimal nonlinear kernel function comprises a nonlinear kernel function that satisfies a kernel parameter optimization problem.

3. The method of claim 2 wherein:
said at least one nonlinear kernel function comprises a Gaussian Radial Basis Function defined by: $\kappa(x,z) = e^{-\gamma\|x-z\|^2}$; and
a parameter $\gamma$ of said Gaussian Radial Basis Function is determined by solving an optimization problem:

$$\hat{\gamma} = \underset{\gamma}{\operatorname{argmax}} \sum_j SCI(\alpha'_j(\gamma))$$

wherein SCI represents an outlier rejection measure obtained when deriving said sparse reconstruction of samples from a first subset of training data against a dictionary constructed with a different subset of said training data in said higher dimensional feature space.

4. The method of claim 1 wherein said at least one nonlinear kernel function comprises a homogeneous polynomial kernel comprising k x, z=(x·z)d.

5. The method of claim 1 wherein said at least one nonlinear kernel function comprises an inhomogeneous polynomial kernel.

6. A system for detecting anomalies in video footage, said system comprising:
    a processor;
    a data bus coupled to said processor; and
    a computer-usable medium embodying computer program code, said computer-usable medium being coupled to said data bus, said computer program code comprising instructions executable by said processor and configured for:
        in an offline phase, constructing a training dictionary comprising a plurality of event classes,
        in an offline phase, defining at least one event as an n-dimensional feature vector extracted from training video data;
        in an offline phase, categorizing said events into said plurality of event classes according to said n-dimensional feature vector;
        using parametric representations of vehicle trajectories to define said n-dimensional feature vectors;
        in an offline phase, experimentally selecting at least one optimal nonlinear kernel function;
        in an offline phase, using said selected optimal nonlinear kernel function to transform said n-dimensional feature vectors into a higher dimensional feature space by optimizing a kernel function parameterization;
        in an offline phase, setting a threshold indicative of whether or not a sample is anomalous;
        in an online phase, receiving at least one test event comprising a vehicle trajectory within an input video sequence of said video footage;
        in an online phase, deriving a sparse reconstruction with respect to said training dictionary in said higher dimensional feature space induced by said at least one nonlinear kernel function further comprising solving an optimization problem as follows:

$$\hat{\alpha}' = \underset{\alpha}{\operatorname{argmin}} \|\alpha'\|_1$$

subject to $$\|\phi(y) - A_\phi \alpha'\|_2 < \varepsilon$$

wherein α' comprises a sparse reconstruction coefficient vector, Φ(γ) comprises a transformation of a test event vector γ into said higher dimensional feature space, and $A_Φ$ comprises a dictionary representation in said higher dimensional feature space wherein said optimization problem is solved with a modified version of an Orthogonal Matching Pursuit algorithm; and in an online phase, determining if said at least one test event is anomalous according to said derived sparse reconstruction according to said threshold with respect to said training dictionary in said higher dimensional feature space induced by said at least one nonlinear kernel function.

7. The system of claim 6 wherein said optimal nonlinear kernel function comprises a nonlinear kernel function that satisfies a kernel parameter optimization.

8. The system of claim 7 wherein:
said at least one nonlinear kernel function comprises a Gaussian Radial Basis Function defined by $κ(x,z)=e^{-γ\|x-z\|^2}$; and
a parameter γ of said Gaussian Radial Basis Function is determined by solving an optimization problem:

$$\hat{γ} = \underset{γ}{\operatorname{argmax}} \sum_j SCI(α'_j(γ))$$

wherein SCI represents an outlier rejection measure obtained when deriving said sparse reconstruction of samples from a first subset of training data against a dictionary constructed with a different subset of said training data in said higher dimensional feature space.

9. The system of claim 6 wherein said at least one nonlinear kernel function comprises a homogeneous polynomial kernel comprising k x, z=(x·z)d.

10. The system of claim 6 wherein said at least one nonlinear kernel function comprises an inhomogeneous polynomial kernel.

11. A non-transitory processor-readable medium storing computer code representing instructions to cause a process for detecting anomalies in video footage, said computer code comprising code to:

in an offline phase, construct a training dictionary comprising a plurality of event classes, in an offline phase, defining at least one event as an n-dimensional feature vector extracted from training video data;

in an offline phase, categorizing said events into said plurality of event classes according to said n-dimensional feature vector;

using parametric representations of vehicle trajectories to define said n-dimensional feature vectors;

in an offline phase, experimentally select at least one optimal nonlinear kernel function;

in an offline phase, using said selected optimal non-linear kernel function to transform said n-dimensional feature vectors into a higher dimensional feature space by optimizing a kernel function parameterization;

in an offline phase, set a threshold indicative of whether or not a sample is anomalous;

in an online phase, receive at least one test event comprising a vehicle trajectory within an input video sequence of said video footage;

in an online phase, deriving a sparse reconstruction with respect to said training dictionary in said higher dimensional feature space induced by said at least one nonlinear kernel function further comprising solving an optimization problem as follows:

$$\hat{α}' = \underset{α}{\operatorname{argmin}} \|α'\|_1$$

subject to $$\|φ(y) - A_φ α'\|_2 < ε$$

wherein α' comprises a sparse reconstruction coefficient vector, Φ(γ) comprises a transformation of a test event vector γ into said higher dimensional feature space, and $A_Φ$ comprises a dictionary representation in said higher dimensional feature space wherein said optimization problem is solved with a modified version of an Orthogonal Matching Pursuit algorithm; and in an online phase, determine if said at least one test event is anomalous according to said derived sparse reconstruction according to said threshold with respect to said training dictionary in said higher dimensional feature space induced by said at least one nonlinear kernel function.

12. The non-transitory processor-readable medium of claim 11 wherein said optimal nonlinear kernel function comprises a nonlinear kernel function that satisfies a kernel parameter optimization problem.

13. The non-transitory processor-readable medium of claim 11 wherein said at least one nonlinear kernel function comprises a homogeneous polynomial kernel comprising k x, z=(x·z)d.

14. The non-transitory processor-readable medium of claim 11 wherein said at least one nonlinear kernel function comprises a inhomogeneous polynomial kernel.

* * * * *